United States Patent Office 3,027,369
Patented Mar. 27, 1962

3,027,369
DERIVATIVES OF Bz-1'-(ALPHAANTHRAQUINO-NYLAMINO)-BENZANTHRONE-2,2'-ACRIDINE
William Baptist Hardy, Bound Brook, and Isaiah Von, Somerville, N.J., assignors to American Cyanamid Company, New York, N.Y., a corporation of Maine
No Drawing. Filed June 8, 1953, Ser. No. 360,336
7 Claims. (Cl. 260—247.1)

This invention relates to new vat dyestuffs of the 4-amino - Bz-1'-(alphaanthraquinonylamino)benzanthrone-2,2'-acridine series having the following formula:

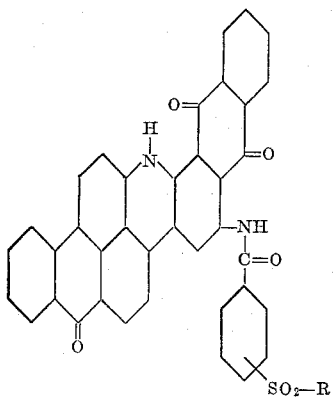

where the —$SO_2$—R group occupies the meta or para position relative to the —CO group and R is the radical of a secondary amine, either aliphatic or cyclic. For simplicity in the specification this basic ring structure will be referred to as benzanthrone anthraquinone acridine.

Dyestuffs for the dyeing of military uniforms present a serious problem. The enormous increase in fire power in modern warfare makes it imperative for soldiers to blend into the terrain so that they are either unobserved or present relatively poor targets. The art of camouflage resulted in the development of uniforms having colors which blend into the average landscape. During the Second World War, observation by means of infrared radiation completely changed the problem of camouflage because, while dyes of excellent fastness and dull drab shades under visible light were generally used for the dyeing of uniforms, all of the fast dyes with otherwise desirable properties showed high reflectance in the infrared and therefore soldiers wearing uniforms dyed with these dyes when observed under infrared radiation, for example by means of devices such as snooperscopes and sniperscopes, stood out against average terrain making discovery easy and presenting excellent targets.

Extensive investigations have shown that to be effective under infrared observation, dyed fabrics must show an infrared reflectance which is relatively low, preferably below 25%, but which of course should not be too low. In other words in average terrain, a soldier to be effectively concealed or to present a poor target should appear no lighter than the background and, while it is undesirable that a soldier should appear much darker, any difference in infrared reflectance from that of the terrain should be on the darker rather than on the lighter side.

There are known some dyes, for example some sulfur dyes, which exhibit low infrared reflectance. These dyes, however, have such inferior fastness to light and to the rather drastic washing conditions in the field that they are not practical. On the other hand, vat dyes which show satisfactory light and wash fastness have, in the past, also shown high infrared reflectance. The need for vat dyes of low infrared reflectance and satisfactory fastness properties has therefore been unfulfilled, both for use as the only dyes for uniforms and for use in blends with small amounts of other dyes of higher infrared reflectance.

According to the present invention we have found that certain benzanthrone anthraquinone acridine dyestuffs combine low infrared reflectance with light and wash fastness properties adequate for military use. The benzanthrone antraquinone acridine ring structure is known. However, we have found that when there is a benzoylamino group and there is a sulfonamido group attached to the benzene ring of the benzoyl group, vat dyes result which not only have a low infrared reflectance but also excellent characteristics with regard to fastness to light, washing, bleaching and other treatments to which military equipment is ordinarily subjected and dye a shade of olive which is suitable for many military uses. We do not know why the comparatively small change in terms of molecular weight on so large a molecule should produce such a great difference in its practical properties as a military vat dye and hence no theory is advanced which would limit the invention.

The dyes of the present invention may be prepared by reacting a m- or p-sulfonamido benzoic acid halide or anhydride with 4-amino-benzanthrone anthraquinone acridine, the acylating agent being prepared by reacting chloro-sulfonylbenzoic acid with a secondary amine, such as a dialkylamine, dimethylamine, diethylamine, methylethylamine, or dibutylamine, a diarylamine such as diphenylamine, an alkylarylamine, such as methylaniline, ethylaniline, or a cyclic amine such as morpholine, piperidine, pyrrolidine and the like. The resulting sulfamylbenzoic acid is then converted into its acid chloride or anhydride by conventional means.

It is an advantage of the present invention that the processes of preparing the new dyestuffs are simple and yields in the various steps are good.

It should be understood that the dyestuffs of the present invention may be used alone where the olive shades which they produce are the ones desired or they may be used with other vat dyestuffs. This latter is a definite advantage of the present invention because the infrared reflectance of the dyestuffs is so low that blends are possible without exceeding the predetermined maximum infrared reflectance.

The invention will be illustrated in greater detail in conjunction with the following specific examples, in which the parts are by weight unless otherwise specified.

*Example 1*

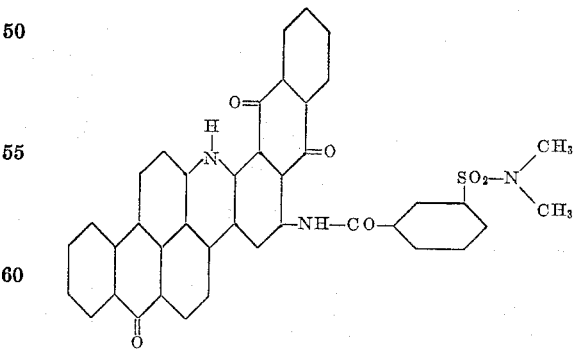

10.5 parts of m-dimethylsulfamylbenzoic acid (prepared by condensing m-chlorosulfonylbenzoic acid with dimethylamine) are mixed with 150 parts of thionyl chloride. The mixture is refluxed with stirring until the acid chloride formation is substantially complete. The excess thionyl chloride is then evaporated off under reduced pressure, and 150 parts of nitrobenzene, 2.5 parts of pyridine and 10.5 parts of 4-aminobenzanthrone anthraquinone acridine are added. The mixture is heated to 150° C. with stirring until the acylation is substantially complete. It is then cooled to 80° C. and diluted with 250 parts of alcohol. This results in precipitation and the precipitate is isolated by filtration and washed thoroughly with alcohol. The cake thus obtained is then extracted with 250 parts of boiling pyridine and again isolated by filtration and washing. It dyes cotton an olive shade of good fastness properties and low infrared reflectance.

*Example 2*

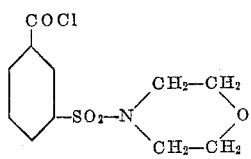

15 parts of m-chlorosulfonylbenzoic acid are added to a solution of 25 parts of morpholine in 100 parts of water. There is a spontaneous rise in temperature which is kept below 60° C. by a bath. After stirring for an hour and 15 minutes, the reaction mixture is acidified to precipitate a white solid. This product, which is 4-(3-carboxybenzenesulfonyl)morpholine, melts at 188–191° C. When 10 parts of this acid are mixed with 50 parts of thionyl chloride and the mixture is refluxed for one hour, there is obtained on evaporation of the excess thionyl chloride in vacuo an excellent yield of the corresponding acid chloride, melting at about 114° C.

*Example 3*

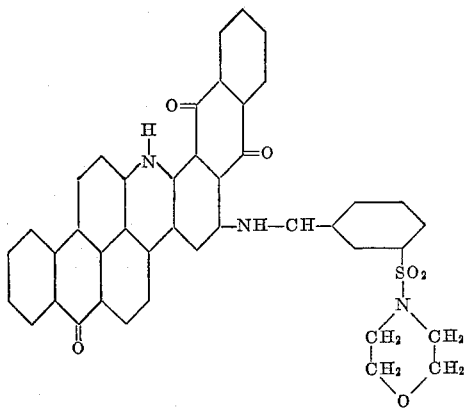

A mixture of 27.1 parts of the product of Example 2, 23.2 parts of 4-aminobenzanthrone anthraquinone acridine, 2.5 parts of pyridine and 300 parts of nitrobenzene is heated with stirring until acylation is substantially complete. The reaction mixture is then cooled to 80° C. and 500 parts of alcohol are added. After stirring until precipitation is complete, the mixture is filtered and the filter cake washed with alcohol. It is then extracted with 250 parts of hot pyridine and dried. The product dyes cotton an olive shade of good fastness properties and low infrared reflectance.

*Example 4*

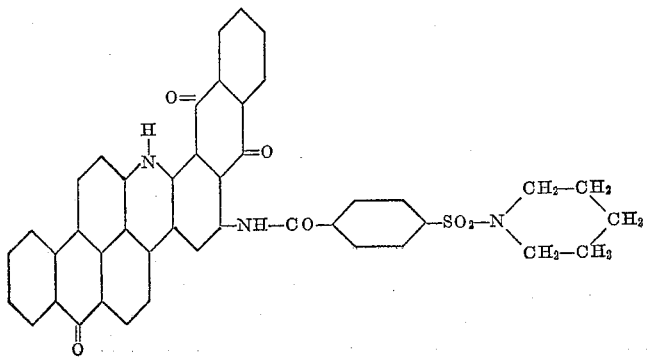

54 parts of 1-(4-carboxybenzenesulfonyl)piperidine are prepared by the action of piperidine on p-chlorosulfonylbenzoic acid by the process of Example 2. This is then mixed with 82 parts of thionyl chloride and 80 parts of dry benzene and refluxed until formation of the acyl chloride is complete. Thereupon the benzene and the excess thionyl chloride are distilled off under vacuum. To to the residue are added 2.5 parts of pyridine, 23.2 parts of 4-aminobenzanthrone anthraquinone acridine and 300 parts of nitrobenzene. The reaction mixture is heated at 150° C. with stirring until acylation is substantially complete. Thereupon 250 parts of alcohol are added after cooling the reaction mixture and it is allowed to stand with stirring until precipitation is complete. The mixture is then filtered, the filter cake washed with alcohol, extracted with 250 parts of hot pyridine and dried. The product which is obtained gives a dark brown solution in sulfuric acid. It dyes cotton an olive shade having good fastness properties and low infrared reflectance.

*Example 5*

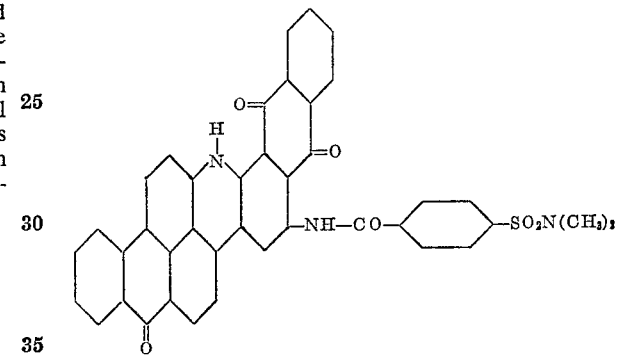

The procedure of Example 4 is followed except that the 1-(4-carboxybenzenesulfonyl)piperidine is replaced with 42 parts of p-(dimethylsulfamyl)benzoic acid prepared by reaction of dimethylamine with p-chlorosulfamylbenzoic acid by the procedure of Example 2. The product obtained dyes cotton olive shades which have low infrared reflectance and good light and wet fastness properties.

*Example 6*

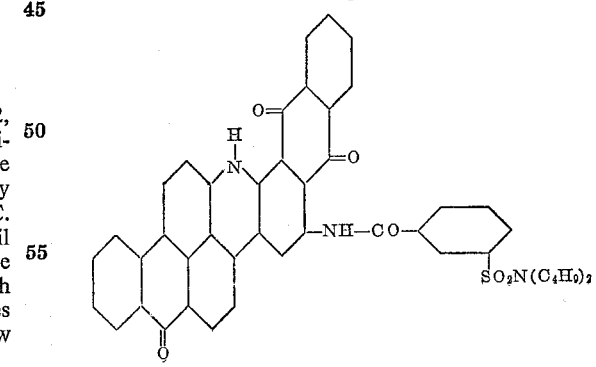

m-Chlorosulfamylbenzoic acid is reacted with di-(n-butyl)amine by the procedure of Example 2. The resulting product is then refluxed with 72 parts of thionyl chloride and 150 parts of benzene until the reaction is substantially complete. Thereupon the benzene and excess thionyl chloride are removed by distillation under vacuum. To the residue are then added 600 parts of nitrobenzene and 46.4 parts of 4-aminobenzanthrone anthraquinone acridine. The mixture is stirred at 150° C. until the acylation is substantially complete, whereupon it is cooled slightly and diluted with 200 parts of alcohol. The reaction mixture is then stirred until precipitation is complete and filtered, the filter cake being washed with alcohol. The filter cake is then extracted with pyridine and dried, producing a product which dissolves in concentrated sulfuric acid with a brown color and dyes cotton olive shades of good fastness and low infrared reflectance.

We claim:
1. Compounds of the formula:

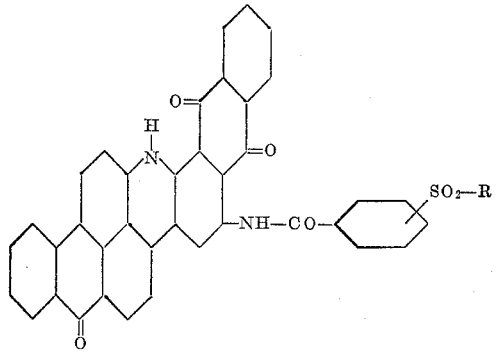

in which the —SO$_2$— radical is attached to a position on the benzoyl group separated from the position on the ring connected to the carbonyl group by at least one carbon atom and R is chosen from the group consisting of N-dialkylamino, N-morpholine and N-piperidyl groups.

2. Compounds according to claim 1 in which R is a dialkylamino radical.

3. A compound of the formula:

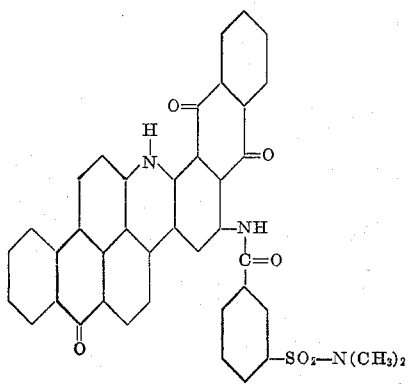

4. A compound of the formula:

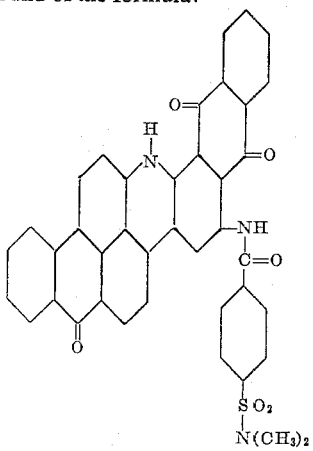

5. A compound of the formula:

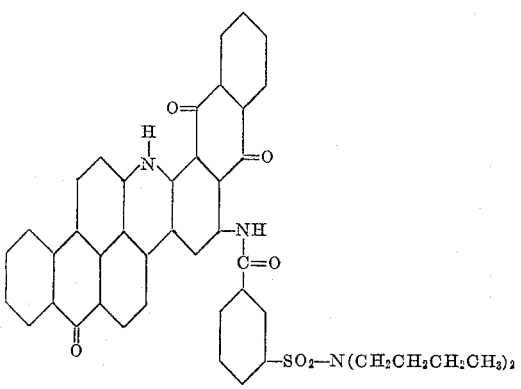

6. A compound of the formula:

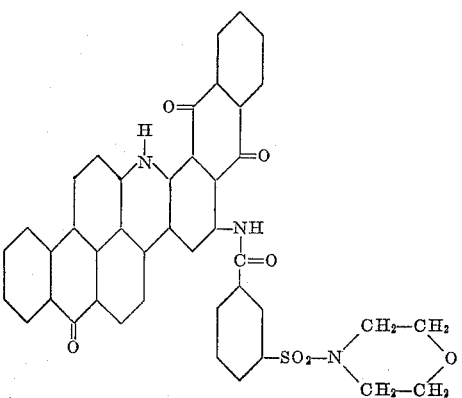

7. A compound of the formula:

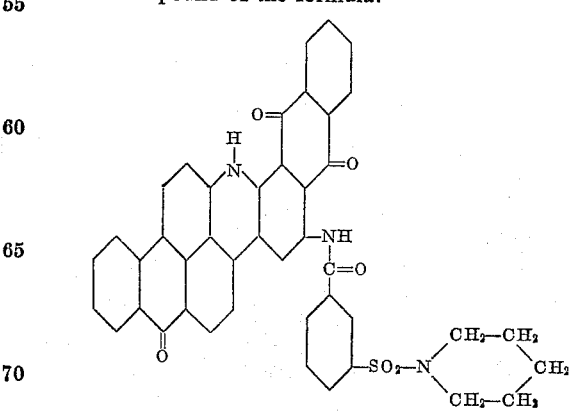

References Cited in the file of this patent
UNITED STATES PATENTS
2,586,233    Kern et al. _____ Feb. 19, 1952